(12) United States Patent
Kim et al.

(10) Patent No.: US 11,566,144 B2
(45) Date of Patent: Jan. 31, 2023

(54) METHOD OF FORMING MULTIPLE COATING ON DRY PLATING MEMBER AND MOLDED ARTICLE MANUFACTURED USING THE SAME

(71) Applicants: HYUNDAI MOTOR COMPANY, Seoul (KR); KIA MOTORS CORPORATION, Seoul (KR)

(72) Inventors: Hyun Kyung Kim, Hwaseong-si (KR); Dong Eun Cha, Hwaseong-si (KR); Jin Young Yoon, Gimpo-si (KR); Hai Chang Lee, Ansan-si (KR); Sun Young Park, Siheung-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/849,057

(22) Filed: Jun. 24, 2022

(65) Prior Publication Data

US 2022/0325123 A1    Oct. 13, 2022

Related U.S. Application Data

(62) Division of application No. 16/903,665, filed on Jun. 17, 2020, now Pat. No. 11,401,437.

(30) Foreign Application Priority Data

Jul. 11, 2019   (KR) .................. 10-2019-0084063

(51) Int. Cl.
*B05D 7/00* (2006.01)
*C09D 133/04* (2006.01)
(Continued)

(52) U.S. Cl.
CPC ............ *C09D 133/04* (2013.01); *B05D 7/53* (2013.01); *B05D 7/534* (2013.01); *C09D 4/06* (2013.01);
(Continued)

(58) Field of Classification Search
CPC ...... B05D 7/53; B05D 7/534; B05D 2350/65; B05D 5/06; B05D 5/066; B05D 2451/00
See application file for complete search history.

(56) References Cited

U.S. PATENT DOCUMENTS

2005/0287354 A1   12/2005  Jennings et al.
2007/0287016 A1   12/2007  Kinjou
(Continued)

FOREIGN PATENT DOCUMENTS

CN    101457058 A    6/2009
CN    103173116 A    6/2013
(Continued)

OTHER PUBLICATIONS

Zeng, H., Ed. Electroplating Process Manual, 2nd Ed. China Machine Press, 1997.6, pp. 706-707.

*Primary Examiner* — Hai Y Zhang
(74) *Attorney, Agent, or Firm* — McDonnell Boehnen Hulbert & Berghoff LLP

(57) ABSTRACT

Disclosed are methods of forming a multiple coating on a dry plating member and a molded article manufactured using the same. The method may include applying a color coating agent onto a surface of a plating layer of a plating member and then drying the applied color coating agent to form a color coating layer, and applying a clear coating agent onto a surface of the color coating layer and curing the applied clear coating agent to form a clear layer, wherein the plating member includes a substrate, an undercoat layer
(Continued)

formed on a surface of at least a part of the substrate, and a plating layer formed on a surface of the undercoat layer.

1 Claim, 3 Drawing Sheets

(51) Int. Cl.
  *C09D 4/06* (2006.01)
  *C09D 5/00* (2006.01)
(52) U.S. Cl.
  CPC .......... *C09D 5/002* (2013.01); *B05D 2350/65* (2013.01)

(56) References Cited

U.S. PATENT DOCUMENTS

2010/0132295 A1* 6/2010 Bootier ............... E04F 13/0841
  52/582.1
2015/0104635 A1* 4/2015 Klug ........................ C08J 7/046
  428/323

FOREIGN PATENT DOCUMENTS

| | | |
|---|---|---|
| CN | 103374245 A | 10/2013 |
| CN | 105131797 A | 12/2015 |
| CN | 107987715 A | 5/2018 |
| KR | 10-2014-0070756 A | 6/2014 |
| WO | WO2018190474 A1 | 10/2018 |

\* cited by examiner

METHOD OF FORMING MULTIPLE COATING ON DRY PLATING MEMBER AND MOLDED ARTICLE MANUFACTURED USING THE SAME

CROSS-REFERENCE TO RELATED APPLICATIONS

The present application is a divisional of U.S. patent application Ser. No. 16/903,665, filed Jun. 17, 2020, which claims, under 35 U.S.C. § 119(a), the benefit of priority to Korean Patent Application No. 10-2019-0084063 filed on Jul. 11, 2019. The entire disclosure contents of these applications are herewith incorporated by reference into the present application.

BACKGROUND

(a) Technical Field

The present disclosure relates to a method of forming a multiple coating on a dry plating member and a molded article manufactured using the same.

(b) Background

Plastic parts utilized in applications such as construction members and interior and exterior parts for vehicles include a plating layer formed on the surface thereof in order to secure corrosion resistance and wear resistance and improve the appearance thereof. In addition, in recent years, the importance of surface treatment technology for interior and exterior parts for vehicles has increased with the goal of extending the life of vehicle parts or increasing the safety thereof by securing durability from various aspects as well as improving the appearance thereof.

Meanwhile, a radiator grille, which is a vehicle component, is a device that acts as a vent that receives air required for cooling a radiator. The radiator grille is generally installed in the form of a lattice in front of the radiator to act as a vent, and it is also called a "front mask" since it includes a front part such as a headlamp.

The above information disclosed in this Background section is provided only for enhancement of understanding of the background of the present disclosure, and therefore it may include information that does not form the prior art that is already known in this country to a person of ordinary skill in the art.

SUMMARY

The present disclosure has been made in an effort to solve the above-described problems associated with existing solutions.

It is one object of the present disclosure to provide a method of forming a multiple coating on a dry plating member to provide chipping resistance, scratch resistance, and durability.

It is another object of the present disclosure to provide a method of forming a multiple coating on a dry plating member to provide improved appearance, chemical resistance, and weather resistance.

It is another object of the present disclosure to provide a method of forming a multiple coating on a dry plating member that is lightweight and exhibits excellent light resistance and adhesion between coating layers.

It is yet another object of the present disclosure to provide a molded article manufactured using the same.

The objects of the present disclosure are not limited to those described above. The objects of the present disclosure will be clearly understood from the following description and are capable of being implemented by means defined in the claims and combinations thereof.

In one aspect, the present disclosure provides a method of forming a multiple coating on a dry plating member. In one embodiment, the method may include applying a color coating agent onto a surface of a plating layer of a plating member and then drying the applied color coating agent to form a color coating layer, and applying a clear coating agent onto a surface of the color coating layer and curing the applied clear coating agent to form a clear layer, wherein the plating member includes a substrate, an undercoat layer formed on a surface of at least a part of the substrate, and a plating layer formed on a surface of the undercoat layer, wherein the color coating agent includes 10 to 35% by weight of a modified acrylic resin, 1 to 25% by weight of a pigment, and 40 to 80% by weight of a first solvent, and wherein the clear coating agent includes 10 to 30% by weight of a polyester-modified acrylic resin, 5 to 25% by weight of an acrylic oligomer, 5 to 45% by weight of an acrylic monomer, 1 to 15% by weight of a photoinitiator, and 10 to 75% by weight of a second solvent.

In one embodiment, the undercoat layer may be formed by applying an undercoating agent including 10 to 65% by weight of an acrylic compound, 0.1 to 5% by weight of a polyester-modified acrylic resin, 0.5 to 5% by weight of a photoinitiator and 30 to 75% by weight of a third solvent on at least one surface of the substrate, followed by curing, and the acrylic compound may include an acrylic monomer and an acrylic oligomer.

In one embodiment, the plating layer may be formed by depositing a metal on a surface of the undercoat layer.

In one embodiment, the color coating layer may be formed by drying the applied color coating agent at 60 to 80° C.

In one embodiment, the modified acrylic resin included in the color coating agent may have a weight average molecular weight of 5,000 to 50,000 g/mol.

In one embodiment, the polyester-modified acrylic resin included in the clear coating layer may have a weight average molecular weight of 5,000 to 50,000 g/mol, a hydroxyl value of 30 to 250 mgKOH/g and a glass transition temperature of 40 to 90° C.

In another aspect, the present disclosure provides a molded article manufactured using the method of forming a multiple coating on a dry plating member. In one embodiment, the molded article may include a substrate, an undercoat layer formed on a surface of at least a part of the substrate, a plating layer formed on a surface of the undercoat layer, a color coating layer formed on a surface of the plating layer, and a clear layer formed on a surface of the color coating layer, wherein the color coating layer is formed using a color coating agent including 10 to 35% by weight of a modified acrylic resin, 1 to 25% by weight of a pigment and 40 to 80% by weight of a first solvent, and wherein the clear coating layer is formed using a clear coating agent comprising 10 to 30% by weight of a polyester-modified acrylic resin, 5 to 25% by weight of an acrylic oligomer, 5 to 45% by weight of an acrylic monomer, 1 to 15% by weight of a photoinitiator and 10 to 75% by weight of a second solvent. In one embodiment, the molded article may further include at least one of 0.1 to 5% by weight of a light stabilizer, 0.1 to 5% by weight of a heat stabilizer, 0.1 to 5% by weight of an adhesion promoter and 0.1 to 10% by weight of an additive based on the total weight of the clear coating agent.

Other aspects and preferred embodiments of the present disclosure are discussed infra.

BRIEF DESCRIPTION OF THE DRAWINGS

The above and other features of the present disclosure will now be described in detail with reference to certain exemplary embodiments thereof illustrated in the accompanying drawings which are given below by way of illustration only, and thus are not limitative of the present disclosure, and wherein.

DETAILED DESCRIPTION

In the following description of the present disclosure, detailed descriptions of known functions and configurations incorporated herein will be omitted when the same may obscure the subject matter of the present disclosure.

The terms which will be described below are defined in consideration of functions in the present disclosure and may be changed according to intentions or customs of users or operators, and thus the definitions should be understood based on the contents throughout the specification for describing the present disclosure.

Method of Forming Multiple Coating on Dry Plating Member

Figure 1:
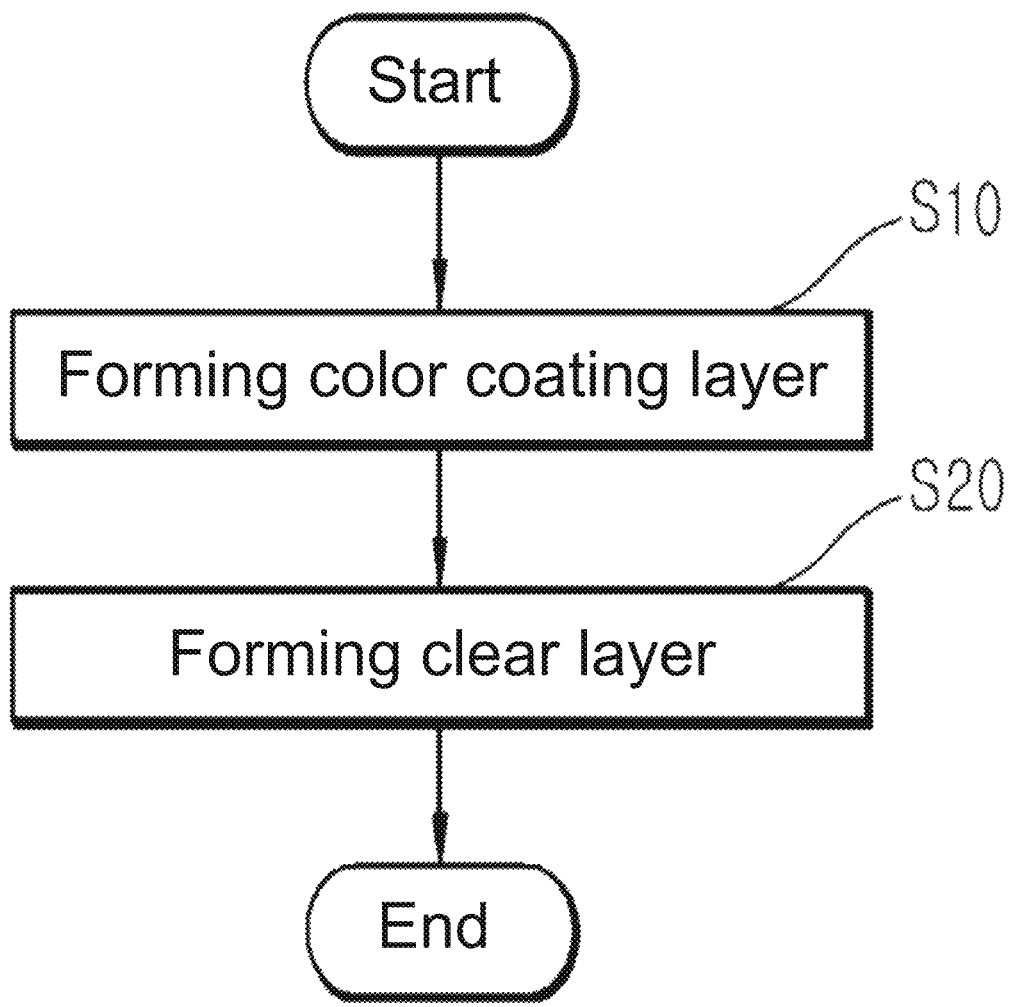
FIG. 1 shows a method of forming a multiple coating on a plating member according to an embodiment of the present disclosure.

One aspect of the present disclosure relates to a method of forming a multiple coating on a dry plating member. FIG. 1 shows a method of forming a multiple coating on a dry plating member according to an embodiment of the present disclosure. Referring to FIG. 1, the method of forming the multiple coating on the dry plating member includes (S10) forming a color coating layer and (S20) forming a clear layer.

More specifically, the method of forming the multiple coating on the dry plating member may include (S10) applying a color coating agent onto a surface of a plating layer of a plating member and drying the applied color coating agent to form a color coating layer, and (S20) applying a clear coating agent onto a surface of the color coating layer and curing the applied clear coating agent to form a clear layer. The color coating agent contains 10 to 35% by weight of a modified acrylic resin, 1 to 25% by weight of a pigment and 40 to 80% by weight of a first solvent, and the clear coating agent contains 10 to 30% by weight of a polyester-modified acrylic resin, 5 to 25% by weight of an acrylic oligomer, 5% to 45% by weight of an acrylic monomer, 1 to 15% by weight of a photoinitiator, and 10% to 75% by weight of a second solvent.

Hereinafter, the method of forming the multiple coating on the dry plating member according to the present disclosure will be described in detail step by step.

(S10) Forming Color Coating Layer

In this step, a color coating agent is applied onto a surface of a plating layer of a plating member and then dried to form a color coating layer.

The plating member includes a substrate, an undercoat layer formed on the surface of at least a part of the substrate, and a plating layer formed on the surface of the undercoat layer.

In one embodiment, the substrate may include polycarbonate (PC), polyvinyl chloride (PVC), polyolefin, polystyrene (PS), polyoxymethylene (POM), ethylene propylene diene monomer (EPDM), polymethyl (meth)acrylate (PMMA), acrylic-styrene-acrylonitrile (ASA), acrylonitrile-butadiene-styrene (ABS) and polyalkylene terephthalate or the like. For example, the substrate may include acrylonitrile butadiene styrene (ABS).

The plating layer is formed in order to ensure the glossiness and corrosion resistance of an injection-molded article according to the present disclosure. In one embodiment, the plating layer may be formed using dry plating. In one embodiment, the plating layer may be formed by depositing a metal on the surface of the undercoat layer. For example, the deposition may be a physical vapor deposition method (PVD), such as vacuum deposition, sputtering or ion plating. For example, the metal may include at least one of stainless alloy (SUS), iron (Fe), aluminum (Al), titanium (Ti) and chromium (Cr).

In one embodiment, the thickness of the plating layer may be 1 to 50 μm. Within this thickness range, the plating layer can exhibit excellent adhesion and appearance.

In one embodiment, the undercoat layer may be formed by applying an undercoating agent containing 10 to 65% by weight of an acrylic compound, 0.1 to 5% by weight of a polyester-modified acrylic resin, 0.5 to 5% by weight of a photoinitiator and 30 to 75% by weight of a third solvent on at least one surface of the substrate, followed by curing. In one embodiment, the undercoat layer may be formed by applying an undercoating agent, followed by photocuring.

Hereinafter, the ingredients of the undercoating agent will be described in detail.

Undercoating Agent (1) Acrylic compound: In one embodiment, the acrylic compound may include an acrylic monomer and an acrylic oligomer.

In one embodiment, the acrylic monomer may include an acrylate monomer having two or more polymerizable functional groups.

The acrylic monomer may be present in an amount of 5 to 30% by weight based on the total weight of the undercoating agent. When the acrylic monomer is present in an amount within the range defined above, adhesion, photocuring efficiency and workability can be excellent.

In one embodiment, the acrylic monomer may include an acrylate oligomer having two or more polymerizable functional groups. The acrylic oligomer may have a weight average molecular weight of 500 to 6,000 g/mol. The mechanical properties of the undercoat layer can be excellent under the conditions defined above.

The acrylic oligomer may be present in an amount of 5 to 45% by weight based on the total weight of the undercoating agent. When the acrylic oligomer is present in an amount within the range defined above, adhesion, photocuring efficiency and workability can be excellent.

In one embodiment, the acrylic compound may be present in an amount of 10 to 65% by weight based on the total weight of the undercoating agent. When the acrylic compound is present in an amount within the range defined above, photocuring efficiency and durability of the undercoat layer can be excellent.

For example, the acrylic monomer and the acrylic oligomer may be present in a weight ratio of 1:0.5 to 1:3.

Miscibility, photocuring efficiency and workability can be excellent within the above weight ratio.

(2) Polyester-modified acrylic resin: the polyester-modified acrylic resin may be included in order to improve the elasticity, flexibility and interlayer adhesion of the undercoat layer.

In one embodiment, the polyester-modified acrylic resin may be prepared by polymerizing an unsaturated polybasic acid with a first reaction product prepared through condensation between a polyhydric alcohol and a polybasic acid to prepare a polyester precursor having a double bond at the end thereof and then polymerizing the polyester precursor with an acrylic monomer.

In one embodiment, the polyester-modified acrylic resin may have a weight average molecular weight of 5,000 to 50,000 g/mol, a hydroxyl value of 30 to 250 mgKOH/g, and a glass transition temperature of 40 to 90° C. Under the above conditions, the viscosity can be easily adjusted, and thus workability can be excellent, and hardness, adhesion and scratch resistance of the undercoat layer can be superior.

In one embodiment, the polyester-modified acrylic resin may be present in an amount of 0.1 to 5% by weight based on the total weight of the undercoating agent. When the polyester-modified acrylic resin is present in an amount within this range, the elasticity, flexibility and adhesion of the undercoat layer can be excellent.

(3) Photoinitiator: the photoinitiator may be included to form a clear layer by photocuring the undercoating agent. In one embodiment, the photoinitiator may include one or more of 2-hydroxy-2-methyl-1-phenylpropane-1-phenone, 1-hydroxycyclohexylphenylketone, benzophenone, 1-(4-isopropylphenyl) 2-hydroxy 2-methyl 1-one, 1-[4-(2-hydroxyethoxy)phenyl]-2-hydroxy-2-methyl propane-1-one, α, α-diethoxyacetophenone, 2,2-diethoxy 1-phenylethanone and bis(2,4,6-trimethyl benzoyl)-phenylphosphine oxide.

In one embodiment, the photoinitiator is present in an amount of 0.5 to 5% by weight based on the total weight of the undercoating agent. When the photoinitiator is present in an amount within this range, deterioration in the mechanical properties of the undercoat layer can be prevented, and reactivity and workability can be excellent.

(4) Third solvent: the third solvent makes it easy to adjust the viscosity of the undercoating agent and improves the smoothness of the undercoat layer and workability during coating.

In one embodiment, the third solvent may include at least one of the aforementioned fast-drying solvent and a slow-drying solvent.

In one embodiment, the fast-drying solvent may be a solvent having an evaporation rate measured according to ASTM D 3539, higher than 0.8. In one embodiment, the fast-drying solvent may include: a hydrocarbon-based solvent such as n-hexane, n-octane, isooctane or cyclohexane; an aromatic hydrocarbon solvent such as toluene, xylene or mesitylene; an alcohol solvent such as methanol, ethanol, n-propyl alcohol or isopropyl alcohol; an ether solvent such as diethyl ether, dipropyl ether, dibutyl ether, tetrahydrofuran, dioxane or cyclopentylmethyl ether; an ester solvent such as ethyl acetate, n-propylacetate, isopropyl acetate, or n-butyl acetate; a ketone solvent such as acetone, methyl ethyl ketone, methyl-n-butyl ketone, or methyl isobutyl ketone; or the like.

In one embodiment, the third solvent may include a fast-drying solvent having a high drying rate and a slow-drying solvent having a relatively low drying rate. The slow-drying solvent may be a solvent having an evaporation rate, measured according to ASTM D 3539, of 0.8 or less. In one embodiment, the slow-drying solvent may include: a hydrocarbon solvent such as dodecane or undecane; an aromatic hydrocarbon solvent such as xylene or mesitylene; an alcohol solvent such as n-butanol, hexanol, 3-methyl-3-methoxybutanol, 3-methoxybutanol, methylcellosolve, ethylcellosolve, butylcellosolve, methylcarbitol, ethylcarbitol, butylcarbitol, propylene glycol monomethyl ether, propylene glycol monoethyl ether, propylene glycol monopropyl ether, propylene glycol mono-n-butyl ether, propylene glycol mono-t-butyl ether, ethylene glycol mono-t-butyl ether, dipropylene glycol monomethyl ether, dipropylene glycol monoethyl ether, dipropylene glycol monopropyl ether, dipropylene glycol monobutyl ether and diacetone alcohol; an ether solvent such as diethylene glycol methyl ethyl ether, diethylene glycol dimethyl ether, diethylene glycol diethyl ether, dipropylene glycol dimethyl ether, diethylene glycol dibutyl ether, propylene glycol monomethyl ether acetate, propylene glycol monoethyl ether acetate, propylene glycol monopropyl ether acetate and dipropylene glycol monomethyl ether acetate; an ester solvent; a ketone solvent such as diisobutyl ketone, ethyl amyl ketone, 2-heptanone, 2-hexanone, 2-octanone, cyclopentanone and cyclohexanone; an amide solvent such as N,N-dimethylformamide and N,N-dimethylacetamide; or a lactone solvent such as γ-butyrolactone.

In one embodiment, the third solvent may include the fast-drying solvent and the slow-drying solvent in a weight ratio of 1:0.3 to 1:1.5. When the fast-drying solvent and the slow-drying solvent are present within the above weight ratio range, the ingredients of the undercoating agent can be easily dispersed, and photocuring efficiency can be excellent.

In one embodiment, the third solvent may be present in an amount of 30 to 75% by weight based on the total weight of the undercoating agent. Within this range, deterioration in the smoothness and the appearance of the undercoating layer can be prevented and miscibility, dispersibility and workability may be excellent.

(5) Additives: In one embodiment, the undercoating agent may further include additives. These components may be included to improve the workability, light resistance and smoothness of the undercoating agent. The additive may include one or more of a leveling agent, a light stabilizer, an antifoaming agent and a wetting agent, but is not limited thereto. In one embodiment, the additive may be present in an amount of 0.01 to 10% by weight based on the total weight of the undercoating agent. For example, the leveling agent may include a silicon-based leveling agent.

In one embodiment, the thickness of the undercoat layer may be 3 to 100 μm. Within this thickness range, the adhesion and mechanical properties of the undercoat layer can be excellent.

The color coating layer imparts color to a multiple coating layer according to the present disclosure, and can be combined with the metal texture representation of the plating layer to provide excellent aesthetics. Hereinafter, the ingredients of the color coating agent will be described in more detail.

Color Coating Agent

The color coating agent contains 10 to 35% by weight of a modified acrylic resin, 1 to 25% by weight of a pigment and 40 to 80% by weight of a first solvent.

(1) Modified acrylic resin: In one embodiment, the modified acrylic resin may have a weight average molecular weight of 5,000 to 50,000 g/mol. Under the above conditions, it is easy to adjust the viscosity, and thus workability when forming the color coating layer, the hardness of the coating film, adhesion and scratch resistance can be excellent.

In one embodiment, the modified acrylic resin is present in an amount of 10 to 35% by weight based on the total weight of the color coating agent. When the modified acrylic resin is present in less than 10% by weight, the durability of the color coating layer is lowered, and when the modified acrylic resin is present in an amount exceeding 35% by weight, miscibility, workability and dispersibility may be deteriorated.

(2) Pigment: The pigment is included to impart color to the color coating layer. In one embodiment, the pigment may include components known in the art without limitation. For example, the pigment may include a known pigment such as pigment red, pigment green, pigment blue, pigment yellow, pigment violet or the like. Other examples thereof include known pigments such as silica, carbon black, iron oxide, titanium oxide ($TiO_2$), antimony (Sb), quinacridone, copper-phthalocyanine and chromium (Cr).

In one embodiment, the pigment is present in an amount of 1 to 25% by weight based on the total weight of the color coating agent. When the pigment is present in an amount less than 1% by weight, aesthetics are deteriorated due to the insignificant coloring effect, and when the pigment is present in an amount exceeding 25% by weight, the dispersibility and miscibility of the color coating agent and the interlayer adhesion and mechanical properties of the color coating layer may be deteriorated.

(3) First solvent: The first solvent makes it easy to adjust the viscosity of the color coating agent and improves the smoothness of the coating layer and workability during coating.

In one embodiment, the first solvent may include a fast-drying solvent and a slow-drying solvent in a weight ratio of 1:1 to 1:3. When the fast-drying solvent and the slow-drying solvent are present within the above weight ratio range, the ingredients of the color coating agent can be easily dispersed, and drying efficiency during thermal drying and the appearance of the prepared color coating layer, such as smoothness thereof, can be excellent. Since the fast-drying solvent and the slow-drying solvent use the same ingredients as described above, a detailed description thereof will be omitted.

In one embodiment, the first solvent is present in an amount of 40 to 80% by weight based on the total weight of the color coating agent. When the first solvent is present in an amount of less than 40% by weight, dispersibility and miscibility are deteriorated, and when the first solvent is present in an amount exceeding 80% by weight, the drying time increases, resulting in poor workability, surface defects in the color coating layer, or deterioration in physical properties.

(5) Additives: In one embodiment, the color coating agent may further include so additives. These components may be included to improve the workability, light resistance and smoothness of the color coating agent. The additive may include one or more of a leveling agent, a light stabilizer, an antifoaming agent and a wetting agent, but is not limited thereto. In one embodiment, the additive may be present in an amount of 0.01 to 10% by weight based on the total weight of the color coating agent. For example, the leveling agent may include a silicon-based leveling agent.

In one embodiment, the color coating layer may be formed by drying the applied color coating agent at 60 to 80° C. Under these conditions, the durability of the color coating agent can be excellent.

In one embodiment, the thickness of the color coating agent may be 1 to 100 μm. Within this thickness range, the adhesion and mechanical properties of the color coating layer can be excellent. For example, the thickness may be 15 to 100 μm.

(S20) Forming Clear Layer

In this step, a clear coating agent is applied on the surface of the color coating layer, and is then dried to form a clear layer. In one embodiment, the clear coating agent may be applied and photocured to form a clear layer. The clear coating agent includes 10 to 30% by weight of a polyester-modified acrylic resin, 5 to 25% by weight of an acrylic oligomer, 5 to 45% by weight of an acrylic monomer, 1 to 15% by weight of a photoinitiator, and 10 to 75% by weight of a second solvent. Hereinafter, the components of the clear coating agent will be described in more detail.

Clear Coating Agent (1) Polyester-modified acrylic resin: the polyester-modified acrylic resin may be included in order to improve the scratch resistance, chipping resistance, flexibility and interlayer adhesion of the clear layer.

In one embodiment, the polyester-modified acrylic resin may be prepared by polymerizing an unsaturated polybasic acid with a first reaction product, prepared through condensation between a polyhydric alcohol and a polybasic acid, to prepare a polyester precursor having a double bond at the end thereof and then polymerizing the polyester precursor with an acrylic monomer.

In one embodiment, the polyester-modified acrylic resin may have a weight average molecular weight of 5,000 to 50,000 g/mol, a hydroxyl value of 30 to 250 mgKOH/g, and a glass transition temperature of 40 to 90° C. Under the above conditions, the viscosity can be easily adjusted and thus workability can be excellent, and chipping resistance, hardness, adhesion and scratch resistance of the clear layer can be superior.

In one embodiment, the polyester-modified acrylic resin may be present in an amount of 10 to 30% by weight based on the total weight of the clear coating agent. When the polyester-modified acrylic resin is present in an amount of less than 10% by weight, the chipping resistance, hardness, flexibility and adhesion of the clear layer may be deteriorated, and when the polyester-modified acrylic resin is present in an amount exceeding 30% by weight, the miscibility and dispersibility of the clear coating layer may be deteriorated.

(2) Acrylic oligomer: In one embodiment, the acrylic monomer may include an acrylate oligomer having two or more polymerizable functional groups. The acrylic oligomer may have a weight average molecular weight of 500 to 6,000 g/mol. Under the above conditions, the mechanical properties of the clear layer can be excellent.

In one embodiment, the acrylic oligomer is present in an amount of 5 to 25% by weight based on the total weight of the clear coating agent. When the acrylic oligomer is present in an amount less than 5% by weight, adhesion and photo-curing efficiency may be deteriorated, and when the acrylic oligomer is present in an amount exceeding 25% by weight, the mechanical strength of the clear coating layer may be deteriorated.

(3) Acrylic monomer: In one embodiment, the acrylic monomer may include an acrylate monomer having two or more polymerizable functional groups.

In one embodiment, the acrylic monomer is present in an amount of 5 to 45% by weight based on the total weight of the clear coating agent. When the acrylic monomer is present in an amount less than 5% by weight, adhesion and photocuring efficiency may be deteriorated, and when the acrylic monomer is present in an amount exceeding 45% by weight, the mechanical strength of the clear coating layer may be deteriorated.

For example, the acrylic monomer and the acrylic oligomer may be present at a weight ratio of 1:2 to 1:4. Within the weight ratio defined above, miscibility, photocuring efficiency and workability can be excellent.

(4) Photoinitiator: the photoinitiator may be included to form a clear layer by photocuring the clear coating agent. In one embodiment, the photoinitiator may include one or more of 2-hydroxy-2-methyl-1-phenylpropane-1-phenone, 1-hydroxycyclohexylphenylketone, benzophenone, 1-(4-isopropylphenyl) 2-hydroxy 2-methyl 1-one, 1-[4-(2-hydroxyethoxy)phenyl]-2-hydroxy-2-methyl propane-1-one, α, α-diethoxyacetophenone, 2,2-diethoxy 1-phenylethanone and bis(2,4,6-trimethyl benzoyl)-phenylphosphine oxide.

In one embodiment, the photoinitiator is present in an amount of 1 to 15% by weight based on the total weight of the clear coating agent. When the photoinitiator is present in an amount of less than 1% by weight, photocuring does not proceed easily, and when the photoinitiator is present in an amount exceeding 15% by weight, the workability and mechanical properties of the clear coating layer may be deteriorated.

(5) Second solvent: The second solvent makes it easy to adjust the viscosity of the clear coating agent and improves the smoothness of the clear layer and workability during photocuring.

In one embodiment, the second solvent may include a fast-drying solvent and a slow-drying solvent at a weight ratio of 1:0.8 to 1:2. When the fast-drying solvent and the slow-drying solvent are present within the above weight ratio range, the ingredients of the clear coating agent can be easily dispersed, and drying efficiency during photocuring and the appearance of the prepared clear coating layer, such as the smoothness thereof, can be excellent. Since the fast-drying solvent and the slow-drying solvent use the same ingredients as described above, a detailed description thereof will be omitted.

In one embodiment, the second solvent is present in an amount of 10 to 75% by weight based on the total weight of the clear coating agent. When the second solvent is present in an amount of less than 10% by weight, dispersibility and miscibility are deteriorated, and when the second solvent is present in an amount exceeding 75% by weight, the drying time increases, resulting in poor workability, surface defects in the clear coating layer, or deterioration in physical properties.

In one embodiment, the clear coating agent may include at least one of 0.1 to 5% by weight of a light stabilizer, 0.1 to 5% by weight of a heat stabilizer, 0.1 to 5% by weight of an adhesion promoter, and 0.1 to 10% by weight of an additive based on the total weight of the clear coating agent.

(6) Light stabilizer: The light stabilizer may be included to prevent surface defects in the clear layer and improve light stability and weather resistance. For example, the light stabilizer may include one or more of a triazine ultraviolet light stabilizer and a hindered amine light stabilizer (HALS).

In one embodiment, the triazine UV absorber includes 6-bis (2,4-dimethylphenyl)]-1,3,5-triazine, 6-bis(2,4-dimethylphenyl)-1,3,5 triazine and tris 2,4,6-[2-4-(octyl-2-methylethanoate)oxy-2-hydroxyphenyl]-1,3,5 triazine or the like. These may be used alone or in combinations of two or more, but the present disclosure is not limited thereto.

In one embodiment, the hindered amine UV stabilizer may be 2,2,6,6-tetramethyl-4-piperidyl stearate, 1,2,2,6,6-pentamethyl-4-piperidyl benzoate, N-(2,2,6,6-tetramethyl-4-piperidyl) dodecylsuccinimide, 1-[(3,5-di-t-butyl-4-hydroxyphenyl)propionyloxyethyl]-2,2,6,6-tetramethyl-4-piperidyl-(3,5-di-t-butyl-4-hydroxyphenyl)propionate, bis (2,2,6,6-tetramethyl-4-piperidyl) sebacate, bis(1,2,2,6,6-pentamethyl-4-piperidyl)sebacate, bis(1,2,2,6,6-pentamethyl-4-piperidyl)-2-butyl-2-(3,5-di-t-butyl-4-hydroxybenzyl)malonate, N, N'-bis(2,2,6,6-tetramethyl-4-piperidyl)hexamethylenediamine, tetra (2,2,6,6-tetramethyl-4-piperidyl) butanetetracarboxylate, tetra(1,2,2,6,6-pentamethyl-4-piperidyl) butanetetracarboxylate and bis (2,2,6,6-tetramethyl-4-piperidyl)-di(tridecyl)butanetetracarboxylate or the like. These may be used alone or in combinations of two or more, but the present disclosure is not limited thereto.

The light stabilizer may be present in an amount of 0.1 to 5% by weight based on the total weight of the clear coating agent. When the light stabilizer is present in an amount within the above range, surface defects of the clear layer can be prevented, and weather resistance and an anti-yellowing effect can be excellent.

(7) Heat stabilizer: The heat stabilizer may include a phenol-based, phosphite-based or lactone-based heat stabilizer or the like. In one embodiment, the heat stabilizer may be present in an amount of 0.1 to 5% by weight based on the total weight of the clear coating agent. When the heat stabilizer is present in an amount within this range, thermal stability can be excellent and deterioration in mechanical properties of the clear layer can be prevented.

(8) Adhesion promoter: The adhesion promoter may include an ether adhesion promoter. In one embodiment, the adhesion promoter may be present in an amount of 0.1 to 5% by weight based on the total weight of the clear coating agent. When the adhesion promoter is present in an amount within the above range, interlayer adhesion can be excellent, and deterioration in mechanical properties of the clear layer can be prevented.

(9) Additive: The additive may include, but is not limited to, one or more of a leveling agent, an antifoaming agent and a wetting agent. In one embodiment, the additive may be present in an amount of 0.01 to 10% by weight based on the total weight of the clear coating agent. For example, the leveling agent may include a silicon-based leveling agent.

In one embodiment, the thickness of the clear layer may be 10 to 50 μm. Within the thickness range, the adhesion of the clear layer can be excellent, and mechanical properties such as weather resistance and chipping resistance can be excellent. For example, the thickness of the clear layer may be 20 to 30 μm.

In one embodiment, the sum of the thickness of the color coating layer and the clear layer may be 15 to 90 μm. Under the above condition, the appearance can be excellent, and mechanical properties such as weather resistance and chipping resistance can be excellent. For example, the sum of the thickness may be 45 to 85 μm.

In one embodiment, the color coating layer and the clear layer may be formed at a thickness ratio of 1:1.2 to 1:3. Within this thickness ratio range, both appearance and chipping resistance can be excellent.

In addition, there is no particular limitation as to the method of applying the undercoating agent, color coating agent and clear coating agent. For example, brushing, spray coating, dip coating, spin coating and the like, all of which are widely used in the art, may be used, but the present disclosure is not limited thereto.

Figure 2:
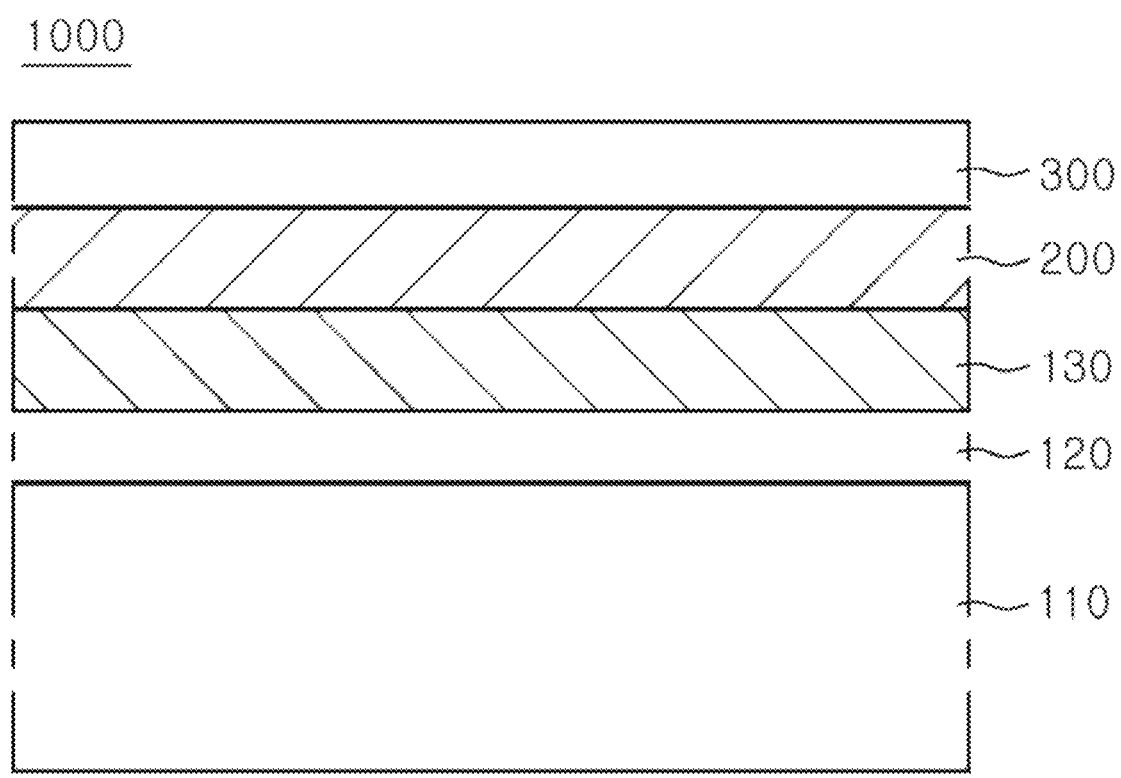
FIG. 2 shows a molded article according to one embodiment of the present disclosure.

Molded Article Manufactured Using Method of Forming Multiple Coating on Plating Member Another aspect of the present disclosure relates to a molded article manufactured using the method of forming the multiple coating on the plating member. FIG. 2 shows a molded article according to one embodiment of the present disclosure. Referring to FIG. 2, the molded article 1000 includes a substrate 110, an undercoat layer 120 formed on a surface of at least a part of the substrate 110, a plating layer 130 formed on a surface of the undercoat layer 120, a color coating layer 200 formed on the surface of the plating layer 130, and a clear layer 300 formed on the surface of the color coating layer 200.

The color coating layer is formed using a color coating agent containing 10 to 35% by weight of a modified acrylic resin, 1 to 25% by weight of a pigment and 40 to 80% by weight of a first solvent, wherein the clear coating layer is formed using a clear coating agent containing 10 to 30% by weight of a polyester-modified acrylic resin, 5 to 25% by weight of an acrylic oligomer, 5 to 45% by weight of an acrylic monomer, 1 to 15% by weight of a photoinitiator and 10 to 75% by weight of a second solvent.

The plating member includes a substrate, an undercoat layer formed on the surface of at least a portion of the substrate, and a plating layer formed on the surface of the undercoat layer.

In one embodiment, the undercoat layer may be formed by applying an undercoating agent containing 10 to 65% by weight of an acrylic compound, 0.1 to 5% by weight of a polyester-modified acrylic resin, 0.5 to 5% by weight of a photoinitiator and 30 to 75% by weight of a third solvent onto at least one surface of the substrate, followed by curing. Since the ingredients and the contents constituting the undercoating agent, the color coating agent and the clear coating agent are the same as described above, a detailed description thereof will be omitted.

In one embodiment, the thickness of the undercoat layer may be 10 to 50 μm. In the thickness range, the adhesion and mechanical properties of the undercoat layer can be excellent.

In one embodiment, the thickness of the plating layer may be 1 to 50 μm. Within the thickness range, the adhesion and appearance of the plating layer can be excellent.

In one embodiment, the thickness of the color coating layer may be 10 to 30 μm. Within the thickness range, chipping resistance, adhesion and appearance of the color coating layer can be excellent. For example, the thickness may be 15 to 20 μm.

In one embodiment, the thickness of the clear layer may be 10 to 50 μm. Within the thickness range, the adhesion of the clear layer can be excellent, and mechanical properties such as weather resistance and chipping resistance can be excellent. For example, the thickness may be 20 to 30 μm.

In one embodiment, the sum of the thickness of the color coating layer and the clear layer may be 15 to 90 μm. Under the above conditions, appearance as well as mechanical properties such as weather resistance and chipping resistance can be excellent. For example, the sum of the thickness may be 45 to 85 μm.

In one embodiment, the color coating layer and the clear layer may be formed in a thickness ratio of 1:1.2 to 1:3. Within the thickness ratio range, both appearance and chipping resistance can be excellent.

In one embodiment, the molded article may be a vehicle radiator grille, but the present disclosure is not limited thereto.

Hereinafter, the configurations and operations of the present disclosure will be described in more detail with reference to preferred embodiments of the present disclosure. However, these embodiments are provided as preferred examples of the present disclosure, and should not be construed as limiting the present disclosure by any means. Details that are not described herein can be sufficiently and technically conceived by those skilled in the art and thus will be omitted.

EXAMPLES AND COMPARATIVE EXAMPLES

Example 1

(1) Preparation of plating member: an undercoating agent containing 10 to 65% by weight of an acrylic compound (including an acrylic monomer and an acrylic oligomer), 0.1 to 5% by weight of a polyester-modified acrylic resin, 0.5 to 5% by weight of a photoinitiator and 30 to 75% by weight of a third solvent was applied onto the surface of a substrate (ABS material) and was then photocured by irradiation with ultraviolet rays at a dose of 800 to 2,000 $mJ/cm^2$ to form an undercoat layer having a thickness of 5 to 25 μm. Then, chromium (Cr) was vacuum-deposited on the surface of the undercoat layer to form a plating layer having a thickness of 5 to 30 μm.

(2) Formation of color coating layer: a color coating agent containing 10 to 35% by weight of a modified acrylic resin, 1 to 25% by weight of a pigment (including a violet pigment and a red pigment), 40 to 80% by weight of a first solvent and 0.1 to 5% by weight of an additive (leveling agent) was prepared.

The color coating agent was applied onto the surface of the plating layer and was then thermally dried at 60 to 80° C. to prepare a color coating layer having a thickness of 30.3 μm.

(3) Formation of clear layer: a clear layer agent containing 10 to 30% by weight of a polyester-modified acrylic resin, 5 to 25% by weight of an acrylic oligomer, 5 to 45% by weight of an acrylic monomer, 1 to 15% by weight of a photoinitiator, 10 to 75% by weight of a second solvent, 0.1 to 5% by weight of a light stabilizer, 0.1 to 5% by weight of a heat stabilizer, 0.1 to 5% by weight of an adhesion promoter and 0.1 to 10% by weight of an additive (leveling agent) was prepared.

Figure 3:
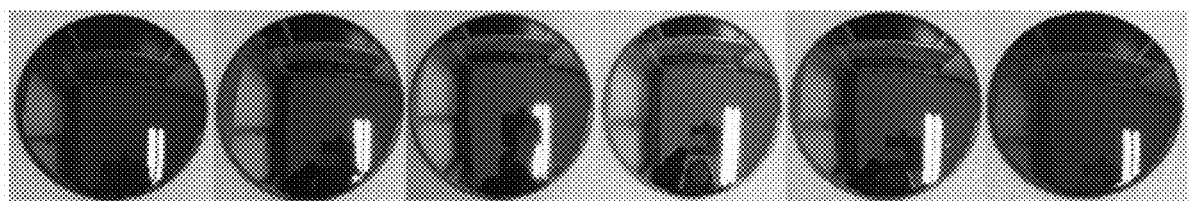
FIG. 3 is an image showing molded article specimens produced according to Examples 1 to 2 of the present disclosure.

The clear coating agent was applied onto the surface of the color coating layer, and was then photocured by irradiation with ultraviolet light at a dose of 800 to 2,000 $mJ/cm^2$ to form a clear layer having a thickness of 51.3 μm and thereby to prepare a molded article specimen as shown in FIG. 3.

Example 2

(1) Preparation of plating member: an undercoating agent containing 10 to 65% by weight of an acrylic compound (including an acrylic monomer and an acrylic oligomer), 0.1 to 5% by weight of a polyester-modified acrylic resin, 0.5 to 5% by weight of a photoinitiator and 30 to 75% by weight of a third solvent was applied onto the surface of a substrate (ABS material) and was then photocured by irradiation with ultraviolet rays at a dose of 800 to 2,000 $mJ/cm^2$ to form an undercoat layer having a thickness of 5 to 25 μm. Then, stainless steel (SUS) was vacuum-deposited on the surface of the undercoat layer to form a plating layer having a thickness of 5 to 30 μm.

In addition, a color coating layer having a thickness of 17.1 μm and a clear layer having a thickness of 38.1 μm were formed in the same manner as in Example 1 except that 1 to 25% by weight of a pigment including a black pigment and a blue pigment was applied as a pigment of the color coating agent to form a molded article specimen as shown in FIG. 3.

Physical Property Evaluation Test

The physical properties of specimens of Examples 1 to 2 were evaluated based on the Hyundai-Kia Motors MS625-01 standard as shown in Table 1 below, and the results are shown in Table 2 below.

TABLE 1

| Test item | Test method and standard (MS625-01) |
|---|---|
| Pencil hardness | HB or higher |
| Adhesive force | M-1~M-2.5 |
| Impact resistance | Coating film has fine cracks, but should not be detached. (4-score evaluation-Very good: ●, good: ○, moderate: ▲, bad: x) |
| Water resistance Saline resistance Acid resistance Alkali resistance Chemical resistance | Coating films should have no discoloration, bleaching, swelling, cracks and gloss deterioration and the like and adhesive force of M-1 to M-2.5. (4-score evaluation-Very good: ●, good: ○, moderate: ▲, bad: x) |
| Heat resistance cycle | Coating films should have no swelling, cracks, gloss deterioration or the like, and have adhesive force of M-1 to M-2.5. |
| High-pressure car cleaning (MS655-14) | After the test, coating films should have a detachment size of less than 2 mm (one scale) and have no problems such as swelling or cracks. (4-score evaluation-Very good: ●, good: ○, moderate: ▲, bad: x) |
| Weather resistance | Coating films should have no discoloration, bleaching, swelling, cracks, gloss deterioration or the like and have adhesive force of M-1 to M-2.5. (4-score evaluation-Very good: ●, good: ○, moderate: ▲, bad: x) |
| Chipping resistance (MS655-14) | After tests of three specimens, two or more specimens should satisfy the following conditions: scratches having a chipping size of 1 mm or more should be 3 or less. In this case, scratches having a chipping size of less than 1 mm or scratches wherein an adherent is not exposed will be excluded from evaluation (4-score evaluation-Very good: ●, good: ○, moderate: ▲, bad: x) |

TABLE 2

| Test item | Example 1 | Example 2 |
|---|---|---|
| Pencil hardness | ● | ● |
| Adhesive force | ● | ● |
| Impact resistance | ● | ● |
| Water resistance | OK (M 2.5) | OK (M 2.5) |
| Saline resistance | OK (M 2.5) | OK (M 2.5) |
| Acid resistance | ● | ● |
| Alkali resistance | ● | ● |
| Oil resistance | ● | ● |
| Chemical resistance | ● | ● |
| Fuel oil resistance | ● | ● |
| Wax resistance | ● | ● |
| Gasoline resistance | ● | ● |
| Heat resistance cycle | OK (M 2.3) | OK (M 2.3) |
| High-pressure car cleaning | ● | ● |
| Weather resistance | ● | ● |
| Chipping resistance | ● | ● |

As can be seen from the results of Table 2, the molded articles of Examples 1 to 2 according to the present disclosure have excellent appearance, chipping resistance, scratching resistance, durability, chemical resistance and weather resistance and are lightweight, and thus can efficiently replace conventional metal parts, and have excellent light resistance and adhesive force between the coating layer and the coating layer.

As apparent from the foregoing, the method of forming the multiple coating on the dry plating member according to the present disclosure and the molded article manufactured thereby are highly lightweight and exhibit excellent chipping resistance, scratch resistance, durability, appearance, chemical resistance, weather resistance, light resistance and adhesive force between the substrate, the plating layer and the coating layer.

The effects of the present disclosure are not limited to those mentioned above. It should be understood that the effects of the present disclosure include all effects that can be inferred from the foregoing description of the present disclosure.

The present disclosure has been described in detail with reference to preferred embodiments thereof. However, it will be appreciated by those skilled in the art that changes may be made in these embodiments without departing from the principles and spirit of the present disclosure, the scope of which is defined in the appended so claims and their equivalents.

The invention claimed is:

1. A molded article comprising:
   a substrate;
   an undercoat layer formed on a surface of at least a part of the substrate;
   a plating layer formed on a surface of the undercoat layer;
   a color coating layer formed on a surface of the plating layer; and
   a clear layer formed on a surface of the color coating layer,
   wherein the color coating layer is formed using a color coating agent comprising 10 to 35% by weight of a modified acrylic resin, 1 to 25% by weight of a pigment and 40 to 80% by weight of a first solvent based on a total weight of the color coating agent, and
   wherein the clear layer is formed using a clear coating agent comprising 10 to 30% by weight of a polyester-modified acrylic resin, 5 to 25% by weight of an acrylic oligomer, 5 to 45% by weight of an acrylic monomer, 1 to 15% by weight of a photoinitiator and 10 to 75% by weight of a second solvent based on a total weight of the clear coating agent.

* * * * *